United States Patent Office 3,384,584
Patented May 21, 1968

3,384,584
SOLID LUBRICANT DISPERSIONS
Aleksander Jerzy Groszek, Ealing, London, England, assignor to The British Petroleum Company Limited, London, England, a corporation of England
No Drawing. Filed Mar. 15, 1967, Ser. No. 623,247
Claims priority, application Great Britain, Mar. 22, 1966, 12,525/66
9 Claims. (Cl. 252—30)

ABSTRACT OF THE DISCLOSURE

Intimate mixtures of graphite and sulphur-containing materials when ground in a high-energy will in a low boiling point, low viscosity, low surface tension organic liquid have high thickening power and load carrying capacity.

---

This invention relates to improvements in solid lubricants and to lubricating compositions prepared from them.

It is known to use certain mixtures of solid lubricants, for example, graphite and molybdenum disulphide, in particular lubricant applications.

This invention relates to oleophilic intimate mixtures of graphite and sulphur-containing materials prepared by grinding together mixtures of graphite and sulphur-containing materials in a low boiling point, low viscosity, low surface tension organic liquid.

This invention further relates to lubricating compositions based on a mineral or synthetic base oil thickened by oleophilic intimate mixtures of graphite and sulphur-containing materials.

This invention yet further relates to composites which comprise a metal or a solid polymeric matrix containing oleophilic intimate mixtures of graphite and sulphur-containing materials and to bearings fashioned from such composites.

The oleophilic intimate mixtures of graphite and sulphur-containing materials, the base oil for the lubricating composition, and lubricating compositions according to the invention are described in detail below.

Oleophilic intimate mixtures of graphite and sulphur-containing materials

Oleophilic solids will adsorb n-dotriaconate in preference to n-butanol in contrast to non-oleophilic solids.

Both natural and synthetic graphite are well-known and readily available. The synthetic material is, for example, produced from petroleum coke by heating to from 1000° to 3000° C. in a vacuum or inert gas. Typically it contains from 95 to 100% wt. carbon. The natural material may have a slightly lower carbon content than this and usually has a larger crystal size.

The term sulphur-containing materials includes sulphur, mixtures of metal powders and sulphur and covalent or ionic metal sulphides.

The proportion of graphite to sulphur-containing material may be from 100:1 to 1:100. For greases, however, it is preferred to use more than 25% by weight of sulphur-containing material.

The oleophilic intimate mixture can be obtained by grinding natural or synthetic graphite and a sulphur-containing material in most organic liquids but it is desirable to use one the bulk of which can be easily removed from the oleophilic intimate mixture. Those liquids distilling below 500° C. and having a viscosity below 600 centistokes at 100° F. (38° C.) are therefore preferred. (Liquids having a surface tension below 72 dynes/cm., preferably from 10 to 40 dynes/cm., at 25° C. are preferred.)

Suitable organic liquids are lower molecular weight hydrocarbons, including straight-chain or branched-chain, saturated or unsaturated alkyl compounds, saturated or unsaturated, substituted or unsubstituted, cyclo-alkyl compounds, and substituted or unsubstituted aromatic compounds. Examples of such compounds are n-heptane, octene-2,2,2,4-trimethylpentane, cyclohexane, benzene or toluene. Branched alkyl compounds are particularly preferred. Other suitable organic liquids are those compounds which contain fluorine, chlorine, or phosphorus and chlorine, for example, carbon tetrachloride.

Other suitable organic liquids are the polar oxygen compounds such as isopropyl alcohol. Silicone fluids can also be used.

Low molecular weight hydrocarbons, such as propane, butane and pentane, can be used under pressure as the grinding liquid.

For best results, the amount of graphite and sulphur-containing material in the graphite and sulphur-containing material/organic liquid mixture should not exceed 50% wt.; preferably it should be from 2 to 20% wt.

The grinding may be carried out in any suitable grinding mill or device and it is desirable to continue the grinding until an oleophilic intimate mixture having a surface area (as determined by nitrogen adsorption) of from 10 to 800, preferably from 20 to 200, square metres per gram is obtained. Usually this can be achieved by grinding at normal temperatures for the required period but the temperature of the mixture may be artificially increased if desired, for example, up to 400° C. In this case, liquids which have viscosities up to 600 centistokes at 100° F. (38° C.) may be used, for example, mineral lubricating oils, ranging from "spindle" oils to "bright stocks."

One of the quickest and most effective techniques is to carry out the grinding in a vibratory ball mill.

It is desirable to exclude air so far as possible during the grinding operation and this can be most easily achieved by filling the mill with the organic liquid first, followed by the balls and graphite. A suitable procedure is to fill the mill with the liquid, add half the balls, then the graphite and sulphur-containing material and finally the rest of the balls. Such a grinding procedure might be referred to as a "closed" system.

When using a ball mill, it is of course desirable to use balls made of a material which does not react with the graphite or sulphur-containing material and which does not wear unduly during the grinding. Vibratory ball mills usually contain steel balls and these are suitable for the present purpose. It is particularly preferred to use a hard grade of steel for the balls and for the grinding chamber.

A magnetic filter can be used, if necessary, to remove small steel particles that may occur in the slurry that is produced in the grinding operation. A circulatory system can also be used wherein the slurry is pumped through an external magnetic filter and then returned to the mill. The circulatory system can be run semi-continuously, the slurry being pumped out after the grinding period and fresh material added to the system.

A suitable vibratory ball mill is sold under the trade name "Megapact," manufactured by Pilamec Limited.

As an initial step the slurry of oleophilic intimate mixture that is produced in the grinding operation can be separated from the grinding balls by sieving or by displacement of the grinding liquid by another liquid and sieving.

If a relatively high boiling organic liquid is used for grinding it may be desirable to displace this liquid by a low boiling liquid. This liquid can then be removed by boiling. It is preferred to use vigorous boiling.

It is also possible to filter the slurry to obtain a filter cake of oleophilic intimate mixture.

In either case it is preferred to remove the last traces of grinding liquid or displacing liquid by heating the oleophilic intimate mixture in a vacuum oven for several hours, for example, at 100° C. and at 1 mm. mercury.

Alternatively and, in some circumstances preferably, the grinding liquid or displacing liquid is not removed from the oleophilic intimate mixture which remains in the slurry. This course is most preferred if the grinding liquid can also act as a base oil for a lubricating composition.

The base oil

The lubricating base oil may be a mineral oil or a synthetic oil.

Suitable mineral oils are refined mineral oils obtained from petroleum, for example, those having a viscosity at 210° F. within the range from 2 to 50 centistokes, preferably from 4 to 40 centistokes.

Synthetic lubricating oils include organic esters, polyglycol ethers, polyphenyl ethers, fluorinated hydrocarbons, silicate esters, silicone oils and mixtures thereof.

The most important class of synthetic oils are the organic liquid polyesters, particularly the neutral polyesters, having a viscosity at 210° F. within the range from 1 to 30 centistokes. The expression "polyester" is used to mean esters having at least two ester linkages per molecule. The expression "neutral" is used to mean a fully esterified product. Examples of suitable polyesters include liquid diesters of aliphatic dicarboxylic acids and monohydric alcohols (for example, dioctyl sebacate, dinonyl sebacate, octyl nonyl sebacate, and the corresponding azelates and adipates), liquid diesters of aliphatic dicarboxylic acids and phenols (for example, those described in co-pending U.K. patent application 31,249/65 and U.K. patent specifications 1,044,550, 1,044,883, 1,058,906 and 1,059,955), and more complex polyesters (for example, those described in U.K. patent specifications 666,697, 743,571, 780,034, 861,962, 933,721, 971,901 and 986,068 and in U.S. Patent 3,321,401 granted May 23, 1967 and U.K. patent application 31,249/65).

Grease lubricating compositions according to the invention

The proportion of oleophilic intimate mixture of graphite and sulphur-containing material to the base oil will depend on the nature of the oil and the consistency of grease required. For most purposes an amount up to 50% wt., based on the final grease, will be used. However, it is remarkable that oleophilic intimate mixture can thicken oils to provide greases with very useful properties at concentrations as low as from 5 to 20% wt., based on the final grease, and this is the preferred concentration range.

The oleophilic intimate mixture can be incorporated into a grease by a number of methods. It is preferred to incorporate the oleophilic intimate mixture into a grease, immediately after grinding. However, if the oleophilic intimate mixture is prepared some time before incorporation into the grease, it is preferred to store the oleophilic intimate mixture in an air-tight container. It may also be stored as a slurry.

The following are examples of methods by which the grease may be prepared:

(a) The grinding liquid is filtered off from the slurry of oleophilic intimate mixture produced in the grinding operation. The resulting filter cake is ground by, for example, feeding the cake through a colloid mill, and the resulting powder is stirred into the oil. The grease produced is finished by colloid milling.

(b) The grinding liquid is boiled off rapidly from the slurry of oleophilic intimate mixture to avoid the formation of a cake of intimate mixture, the resulting powder is stirred into the oil and the grease is finished by colloid milling.

(c) Base oil is added to the slurry of oleophilic intimate mixture and the grinding liquid distilled off.

(d) Base oil is added to the slurry of oleophilic intimate mixture and the mixture circulated through a homogeniser (for example, of the Manton-Gaulin type) so that temperatures up to or exceeding 140° C. are produced. The temperature must be high enough to drive off the grinding liquid.

(e) The grease may also be made directly by grinding the graphite and sulphur-containing material in the base oil for the grease. For example, a low surface tension, low boiling point mineral lubricating oil with a viscosity up to 600 centistokes at 100° F. (38° C.) can be used. Elevated temperatures up to 400° C. can be used during the grinding.

Methods (c), (d) and (e) are particularly preferred. In general, the oleophilic intimate mixtures of graphite and sulphur-containing materials can be incorporated into the base oil either at ambient temperatures or, if desired, at elevated temperatures, for example, up to 400° C.

The greases according to the invention have remarkably high Drop Points. When their drop points are measured according to the IP or ASTM standard methods, they are found to be above 400° C.: such greases are described as "infusible" and are difficult to produce by conventional methods. By using carefully selected base oils, for example, synthetic oils with high oxidation and thermal stability, greases having a unique combination of properties can be produced.

These greases have good oxidation and mechanical stability at temperatures up to about 130° C. to 140° C. when mineral oils are used as the base oils. For temperatures above this range synthetic base oils can be used. Antioxidants may also be used for the more severe operating conditions. Viscosity index improvers, metal deactivators, anti-corrosion agents etc. can also be added to the greases. Load-carrying additives can also be added to the greases according to the invention.

Properties of grease lubricating compositions according to the invention

In general, there are two classes of test method for greases. Firstly there are what might be termed "bench tests." Secondly there are tests in specially designed bearing rigs.

It has been found that the greases according to the invention have (when compared with greases thickened by oleophilic graphite alone) superior load-carrying capacity as measured using the Four-ball Machine (a bench test).

Furthermore, the greases according to the invention have equivalent rheological properties to greases thickened by oleophilic graphite alone, as measured using a penetrometer (a bench test).

Dispersion lubricating compositions

Oleophilic intimate mixtures of graphite and sulphur-containing materials can be incorporated into base oils in quantities up to 15% wt., based on the total weight, to form dispersions with surprisingly good lubricating properties.

The dispersions can be formed quite simply by stirring the oleophilic intimate mixture into the base oil. Alternatively, a mechanical aid to dispersion such as a colloid mill can be used. In fact, any of the methods of preparation specified above for greases can be used.

The base oils used for the dispersions are the same as those used for greases and described above.

Properties of dispersion lubricating compositions

The dispersions according to the invention are stable and, in many cases, it is unnecessary to use dispersing agents.

The dispersions according to the invention have a very high load-carrying capacity, particularly in the extreme pressure region, when tested using the Four-ball Machine.

Composities

The amount of oleophilic intimate mixture of graphite and sulphur-containing material incorporated into the metal or solid polymeric matrix may be as low as 0.1 and as high as 50% wt. but is preferably from 1 to 25% wt. based on the weight of matrix plus oleophilic intimate mixture.

The oleophilic intimate mixture can be incorporated into the metal or solid polymeric matrix by any suitable method. However, it is preferably incorporated into the matrix by the mechanical mixing of either wet or dry powders of the oleophilic intimate mixture. It is preferred to mix the powders wetted with a volatile solvent such as petroleum ether. The mixture may then be compressed, for example, in a die, after removal of any solvent, and sintered at a suitable temperature, for example, above 300° C. for a composite comprising a polytetrafluoroethylene matrix.

Bearings can be fabricated from such composites by any suitable method, for example, by machining or by making use of the compression die mentioned above.

The following examples serve to illustrate the invention.

Examples

A number of dispersions according to the invention were prepared using as the thickening agent oleophilic solid lubricants prepared by grinding mixtures of sulphur-containing materials and graphite in n-heptane in a "Megapact" vibratory ball mill for up to 48 hours. The n-heptane was removed from the oleophilic intimate mixture by vigorous boiling and the resulting powder stirred into the base oil.

The oleophilic products had greatly increased surface areas as measured by the nitrogen adsorption technique and expressed in square metres/gram.

The dispersions were tested in a Four-ball Machine and the results are shown in Table 1 below. Comparison results are given for pure graphite and a pure sulphide. The testing method used was as described in Method 6503 which forms part of U.S. Federal Test Method Standard No. 791a, except that a period of 1 minute was used in one set of tests instead of 10 seconds.

TABLE 1

| Mixture Investigated | BET surface area, m.²/g. | Tests of load carrying capacity of 5% dispersions in medicinal paraffin oil (Four-ball machine) | |
|---|---|---|---|
| | | Mean Hertz Load, kg. | Welding Load, kg. |
| Base oil (Medicinal paraffin oil) | | 13.5 | 110 |
| 100 parts oleophilic graphite | 70 | 19.5 | 140 |
| 20 parts MoS₂, 80 parts graphite | 63 | 24 | 210 |
| 50 parts MoS₂, 50 parts graphite | 53 | 38 | 260 |
| 10 parts PbS, 90 parts graphite | 56 | 28.5 | 250 |
| 20 parts SnS₂, 80 parts graphite | 48 | 26 | 260 |
| 100 parts oleophilic MoS₂, prepared from Dag 325 | 40 | 67 | 370 |
| 100 parts commercial MoS₂ (Dag 325) | 8 | 22.5 | 160 |

Table 2 below gives results for various mixtures of solid lubricants dispersed in a lubricating oil, BG 160/95, which refers to a basic grade mineral oil with a Redwood Viscosity at 140° F. (60°C.) of 160 seconds and a viscosity index of 95. Some comparison results are given for the base oil, pure graphite and a pure sulphide.

TABLE 2

| Solid lubricant dispersed in BG 160/95 | Wear Scar 60 min. test at 15 kg. mm. | Wear Scars, 1 min. Tests, mm. | | | Mean Hertz Load, kg. | Welding Load, kg. |
|---|---|---|---|---|---|---|
| | | 100 kg. | 150 kg. | 200 kg. | | |
| None | 0.79 | 2.5 | | | | 135 |
| +5% wt. oleophilic graphite | 0.77 | | | | 28 | 220 |
| +5% wt. (5 parts sulphur, 95 parts graphite) | 0.44 | | | | 56 | 350 |
| +5% wt. (10 parts sulphur, 90 parts graphite) | 0.66 | | | | 57 | 375 |
| +2% wt. oleophilic PbS | 0.87 | 1.1 | 1.5 | 2.0 | | 250 |
| +5% wt. (20 parts PbS, 80 parts graphite) | 0.42 | 1.4 | 1.7 | 2.0 | 44 | 450 |
| %10+ wt. (20 parts PbS, 80 parts graphite) | 0.33 | 0.97 | 1.4 | 1.5 | 58 | 650 |

The excellent extreme pressure properties of oleophilic graphite/oleophilic lead sulphide mixtures are particularly noticeable.

A number of greases according to the invention were prepared using as a thickening agent oleophilic intimate mixtures of graphite and sulphur-containing materials prepared by grinding about 25 g. of a graphite/molybdenum disulphide mixture in about 180 ml. n-heptane in a "Megapact" vibratory ball mill for four hours. The n-heptane was removed from the oleophilic intimate mixture by vigorous boiling and the resulting powder stirred into the base oil and the grease finished by colloid milling.

The solid lubricant formed was dispersed, using a colloid mill, in medicinal paraffin oil.

The penetration properties of the greases are given in Table 3 below.

TABLE 3

| Properties of grease | 33% MoS₂ (Dag 325) | 33% 20 parts MoS₂, 80 parts graphite | 36% (50 parts MoS₂, 50 parts graphite) |
|---|---|---|---|
| Penetration: | | | |
| Unworked, mm.⁻¹ᵃ | No grease formed. | 272 | 276 |
| Worked, mm.⁻¹ | do | 279 | 276 |
| Bleed, percent wt.ᵇ | | 3.6 | 2.5 |

See footnotes at end of Table 4.

A mixture of graphite and 10% wt. lead sulphide was ground in n-heptane for eight hours in a "Megapact" vibratory ball mill. The n-heptane was removed from the oleophilic intimate mixture by displacement with BG 160/95 (see above). The resultant grease was homogenised in a colloid mill. The properties of this grease were compared with the properties of an equivalent oleophilic graphite thickened grease. The results are shown in Table 4 below.

TABLE 4

| Properties of Grease | (A) Grease containing 15% oleophilic graphite (prepared cf. grease B) | (B) Grease containing an oleophilic intimate mixture of 15% graphite and 1.5% PbS |
|---|---|---|
| Penetration: | | |
| Unworked, mm.⁻¹ᵃ | 272 | 287 |
| Worked, mm.⁻¹ | 306 | 302 |
| Bleed, percent wt.ᵇ | 4.8 | 5.4 |
| Mean Hertz load, kg | 44 | 51 |
| Welding load, kg | 282 | 400 |

ᵃ Measured according to IP Test 50. These penetration values are ¼ scale penetrations converted to full scale readings by the generally accepted correlation established for soap-thickened greases (ASTM D.1403-56T). Due to the different rheological properties of the greases according to the invention these are not exactly the values which would be obtained from a full scale penetration.

ᵇ Measured according to Ministry of Defence Test Specification DTD 825.

The results shown in Tables 1, 2, 3 and 4 show that oleophilic intimate mixtures of graphite and sulphur-containing materials can be used to thicken dispersions and greases. Both the dispersions and greases have high load-carrying capacities and the greases have particularly valuable load-carrying capacity in the extreme pressure region.

I claim:
1. An oleophilic intimate mixture of graphite and a sulphur-containing material selected from the group consisting of sulphur, mixtures of metal powders and sulphur, and covalent or ionic metal sulphides, with a surface area of from 10 to 800 square metres per gram, prepared by grinding a mixture of a natural or synthetic graphite and said sulphur-containing material in an organic liquid distilling below 500° C., having a viscosity below 600 centistokes at 38° C. and a surface tension less than 72 dynes/cm. at 25° C.

2. A product as claimed in claim 1, wherein the organic liquid has a surface tension of from 10 to 40 dynes/cm. at 25° C.

3. A product as claimed in claim 1, wherein the organic liquid is a lower molecular weight hydrocarbon.

4. A product as claimed in claim 1, wherein the organic liquid is a branched alkyl compound.

5. A product as claimed in claim 1, wherein the organic liquid is 2,2,4-trimethylpentane.

6. A product as claimed in claim 1, wherein the grinding is carried out in a vibratory ball mill.

7. A product as claimed in claim 1, wherein the amount of graphite and sulphur-containing material in the graphite and sulphur-containing material/organic liquid mixture does not exceed 50% wt., based on the weight of mixture.

8. A product as claimed in claim 1, wherein the amount of graphite and sulphur-containing material is from 2 to 20% wt.

9. A product as claimed in claim 1 ground to a surface area of from 20 to 200 square metres per gram.

References Cited
UNITED STATES PATENTS

| | | | |
|---|---|---|---|
| 3,059,769 | 10/1962 | Frost | 252—25 |
| 3,338,822 | 8/1967 | Groszek | 252—25 |

DANIEL E. WYMAN, *Primary Examiner.*

I. VAUGHN, *Assistant Examiner.*